(12) United States Patent
Nakajima

(10) Patent No.: US 6,839,341 B1
(45) Date of Patent: *Jan. 4, 2005

(54) DEVICE CAPABLE OF ACCOMMODATING EXISTING VOICE TERMINALS

(75) Inventor: Yasunori Nakajima, Tokyo (JP)

(73) Assignee: Oki Electric Industry Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/534,634

(22) Filed: Mar. 27, 2000

(30) Foreign Application Priority Data

Jun. 17, 1999 (JP) .......................... 11-170401

(51) Int. Cl.[7] .................. H04L 12/66; H04L 12/56; H04B 7/212
(52) U.S. Cl. .................. 370/352; 370/401; 370/442
(58) Field of Search ................ 370/352, 401, 370/336, 347, 354, 360, 412, 442

(56) References Cited

U.S. PATENT DOCUMENTS

| | | | | |
|---|---|---|---|---|
| 4,723,238 A | * | 2/1988 | Isreal et al. ............. | 370/352 |
| 4,771,425 A | * | 9/1988 | Baran et al. ............. | 370/458 |
| 5,251,206 A | * | 10/1993 | Calvignac et al. ........ | 370/352 |
| 6,259,691 B1 | * | 7/2001 | Naudus .................... | 370/352 |
| 6,269,095 B1 | * | 7/2001 | Neubauer et al. ........ | 370/352 |
| 6,381,238 B1 | * | 4/2002 | Hluchyj .................... | 370/352 |
| 6,515,996 B1 | * | 2/2003 | Tonnby et al. ............ | 370/401 |
| 6,643,291 B1 | | 11/2003 | Yoshihara et al. ....... | 370/395.5 |

FOREIGN PATENT DOCUMENTS

| | | |
|---|---|---|
| EP | 0 640 927 | 3/1995 |
| JP | 6386/1994 | 1/1994 |
| JP | 226750/1995 | 8/1995 |
| JP | 09/191324 | 7/1997 |

* cited by examiner

*Primary Examiner*—John Pezzlo
*Assistant Examiner*—Saba Tsegaye
(74) *Attorney, Agent, or Firm*—Rabin & Berdo, P.C.

(57) ABSTRACT

A line unit is connected to an integrated voice/data switching unit by a connection line and includes a plurality of extension interfaces customary with a PBX (Private Branch Exchange). The extension interfaces each accommodate telephones or similar voice terminals and connect them to the switching unit. Each extension interface is connected to a particular packet processing unit by a dual port memory and a 2M highway interface. The line unit switches frame signals subjected to TDM (Time Division Multiplexing) and packets received from a network on a connection line and interchanges voice packets when a communication path is set up.

5 Claims, 6 Drawing Sheets

DEVICE CAPABLE OF ACCOMMODATING EXISTING VOICE TERMINALS

BACKGROUND OF THE INVENTION

1. Field of the Invention

The present invention relates to a device for accommodating voice terminals for voice communication in a switching unit.

2. Description of the Background Art

Today, studies and developments are under way for connecting, e.g., telephones dealing with voice communication and G3 facsimile apparatuses to a local area network (LAN) mainly dealing with data communication in order to implement integrated voice/data communication. For example, IP (Internet Protocol) telephones and personal computers or similar exclusive terminals may be connected, via network cables, to an integrated voice/data switching unit connected to a LAN. The IP telephone sets are capable of sending and receiving data in the form of IP packets. In such a configuration, the telephones and exclusive terminals are capable of holding voice communication with equipment also connected to the LAN.

An IP telephone, for example, includes a control circuit for assembling and disassembling voice packets and control packets, a multifunction CODEC, an input section including numeral keys, a display device including LEDs (Light Emitting Diodes) and an LCD (Liquid Crystal Display), a transmitter/receiver, and a LAN interface. This kind of telephone is capable of interchanging IP packets produced by packetizing a voice signal with an IP network and is a promising new voice communication apparatus.

On the other hand, a digital PBX (Private Branch Exchange) accommodates voice communication terminals including existing telephones belonging to a conventional telephone network. The digital PBX includes extension interfaces each designed for a particular terminal accommodated therein and provides various kinds of voice communication services. The terminals connected to the PBX may be key telephones by way of example. It follows that various kinds of services are expected even with IP telephones.

However, substituting the above integrated voice/data switching unit accommodating IP telephones and other terminals for all of an existing digital PBX system and analog telephone equipment is not desirable from the work and equipment cost standpoint although it will successfully integrate the entire voice communication base into a data communication network. Specifically, a conventional key telephone, for example, does not include a LAN interface and cannot be easily connected to an integrated voice/data switching unit. As a result, when an integrated voice/data switching unit is actually operated, all existing telephones lacking a LAN interface become useless.

To accommodate existing telephones in an integrated voice/data switching unit, it is necessary to newly develop and produce subscriber circuits, trunks or similar interface circuits in accordance with the telephones and switching unit by exclusive designing. This not only further increases the development cost, but also obstructs the effective use of existing equipment. Specifically, various line packages included in a digital PBX for accommodating the telephones cannot be used at all despite that analog telephones and interfaces including office lines and exclusive lines are unchanged.

As stated above, an efficient system implementing integrated voice/data communication with an integrated voice/data switching unit cannot be easily constructed with existing terminals and existing line packages.

SUMMARY OF THE INVENTION

It is therefore an object of the present invention to provide a device allowing existing telephones and line packages to be connected thereto and accommodated in an integrated voice/data switching unit.

A device for accommodating a voice terminal for voice communication and connecting it to a switching unit of the present invention includes a plurality of connecting circuits to which a plurality of interface circuits each accommodating a plurality of voice terminals and controlling the call origination and call incoming thereof are respectively connected by time division multiplexing communication paths. A plurality of storages are respectively connected to the connecting circuits each for storing a frame signal transferred via associated one of the time division multiplexing communication paths. A plurality of packet processing circuits are respectively connected to the storages each for converting the frame signal and packets to each other. A transferring circuit is connected to the packet processing circuits for switching and transferring the packets. A synchronization controller controls synchronization between the interface circuits and the packet processing circuits.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 2:
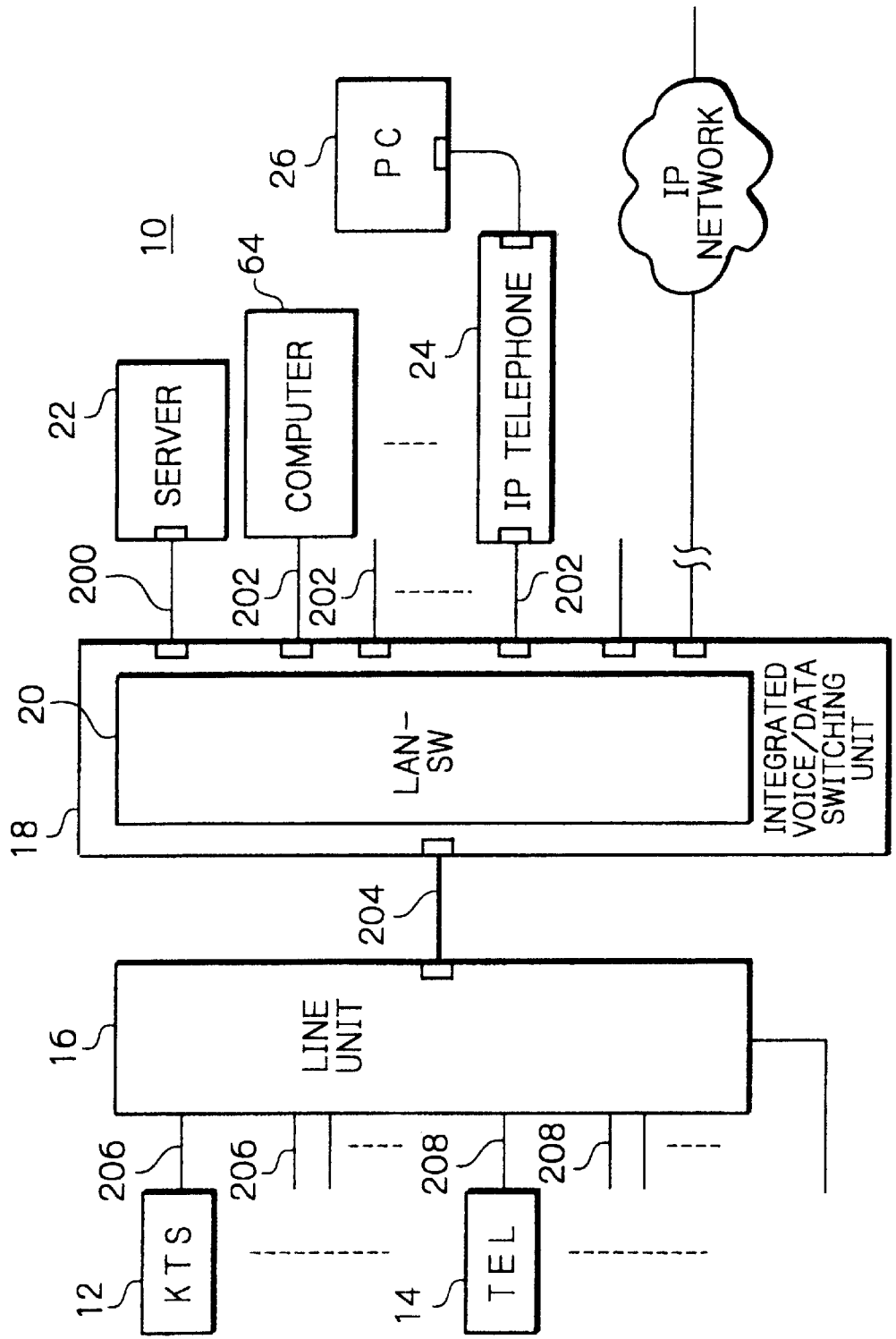
FIG. 2 is a schematic block diagram showing a specific integrated voice/data switching system including the illustrative embodiment.

Referring to FIG. 2 of the drawings, an integrated voice/data switching system to which a voice terminal accommodating device embodying the present invention is applied is shown. As shown, the switching system, generally 10, includes an integrated voice/data switching unit 18 having a LAN switch (LAN-SW) 20. A server 22 and an IP telephone set 24 are connected to the switching unit 18 by 10 Mbps (megabits per second), Ethernet LAN network cables 200 and 202, respectively. A line unit or line accommodating device 16 is also connected to the switching unit 18 by a 100 BASE Ethernet network cable 204. The system 10 sends IP packets including voice data and received from various equipment accommodated therein to desired destinations.

Digital key telephones (KTSs; Key Telephone Systems) 12 and analog telephones (TELs) 14 belonging to an existing PBX telephone system are connected to the integrated voice/data switching unit 18 by cords 206 and 208, respectively. The system 10 may not only be newly installed in an office or similar private facility, but also be added to a telephone system existing in an office or even be substituted for an existing switching unit. Part of the system 10 not directly relevant to the understanding of the present invention is not shown and will not be described specifically. It is to be noted signals appearing in the system 10 are designated by the reference numerals attached to connection lines on which they appear.

Figure 1:
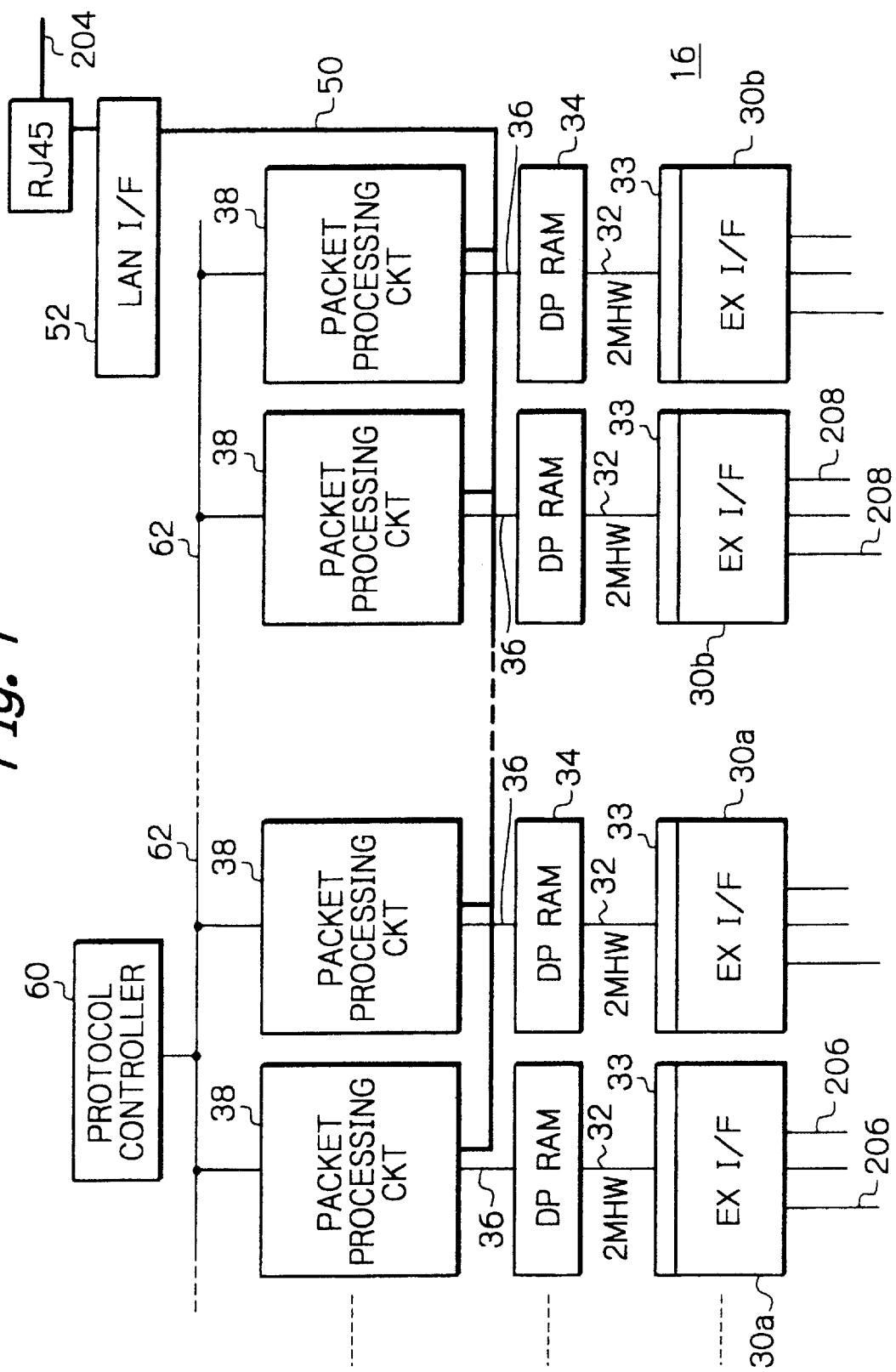
FIG. 1 is a block diagram schematically showing a line accommodating device embodying the present invention.

FIG. 1 shows a specific configuration of the line unit 16 specifically. As shown, digital extension interfaces (EX I/Fs) 30*a* each accommodating a plurality of digital KTSs 12, FIG. 2, and analog EX I/Fs 30*b* each accommodating a plurality of analog TELs 14, FIG. 2, are connected to the line unit 16 by 2M (2 megabits per second highways, 2MHW hereinafter) 32 belonging to a TDM (Time Division Multiplexing) communication path. The digital EX I/Fs 30*a* and analog EX I/Fs 30*b* are implemented as two kinds of line packages. A signal input/output 32 of each EX I/F 30*a* or 30*b* is connected to one port of a particular dual port RAM (Random Access Memory; DP RAM hereinafter) 34. The other port of each DP RAM 34 is connected to a particular packet processing circuit 38 by 2MHWs 36.

Figure 3:
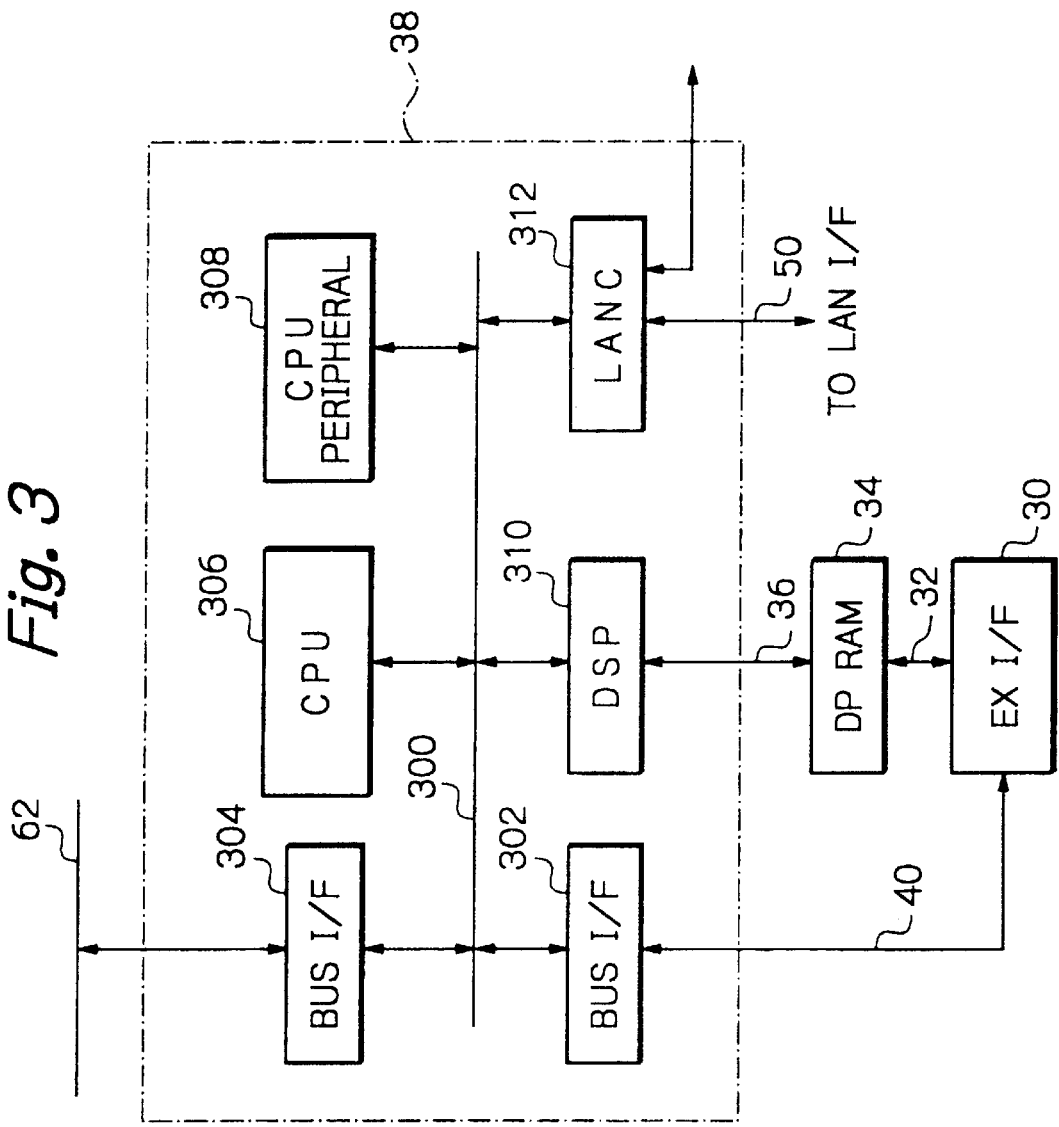
FIG. 3 is a schematic block diagram showing a specific configuration of a packet processing circuit included in the illustrative embodiment.

As shown in FIG. 3, each EX I/F, labeled 30, is connected to the associated packet processing circuit 38 by a bus 40. The EX I/F 30 sends information received from the telephones and including the telephone numbers of destinations to the packet processing circuit 38 via a control line 40. In response, the packet processing circuit 38 outputs to a connection line 50 a control packet containing the above information and voice packets produced by packetizing frames input from the associated DP RAM 34. The connection line 50 is connected to a LAN I/F 52 by star-type network connection or bus-type network connection. When the packet processing circuit 38 receives packets addressed thereto from the LAN I/F 52 via the connection line 50, it disassembles the packets into frames and outputs the frames to the 2MHW 36. As shown in FIG. 1, the line unit 16 has a plurality of signal processing circuits each being made up of the EX I/F 30, DP RAM 34, and voice packet processing circuit 38.

Each EX I/F 30 includes a connection interface applicable to a conventional PBX and multiplexes voice frames and control frames by TDM and interchanges such frames with the DP RAM 34 via the 2MHW 32. In the illustrative embodiment, the communication paths 32 and 36 are implemented by, e.g., a 2M highway interface for multiplexing 64 kbps (kilobits per second) of information with thirty-two channels. Also, the EX I/F 30 generates a frame signal having time slots TS0 through TS 31 every 125 microseconds. The frame signal includes synchronizing bits, voice bits, and control bits. The EX I/F 30 is therefore an analog telephone interface (SLIC), an ISDN (Integrated Services Digital Network) basic interface EX circuit (BRIS), an analog multifunction telephone interace circuit, a digital multifunction telephone interface circuit (DLC) or similar extension interface circuit customarily used with a PBX. The EX I/F 30 may be implemented as a line package formed on a single circuit board. The interface circuits accommodated in the line accommodating device 16 may, of course, be interface trunks for connecting public telephone networks or leased lines or ISPN primary rate interface trunks (BRIT).

More specifically, a plurality of KTSs 12 each are connected to the digital EX I/F 30*a* by a pair of telephone wires 206. The EX I/F 30*a* feeds power to the KTSs 12 and frames the PCM (Pulse Code Modulation) data of voice signals received from the KTSs 12. The resulting frames are output to the 2MHW 32. Also, the EX I/F 30*a* disassembles frame signals input via the 2MHW 32 for reconstructing PCM signals and sends the PCM signals to the KTSs 12. Such transfer is executed by a TCM (Time Compression Modulation) system. The EX I/F 30*a* transforms compansion PCM coded voice signals received from the KTSs 12 to frames and delivers them to the DP RAM 34 via the 2MHW 32. If desired, the EX I/F 30*a* may be of the type including an ISDN basic rate interface (BRI) to which ISDN terminals are connectable. The EX I/F 30*a* executes conflict control over the KTSs 12 connected thereto so as to allocate a particular time slot to each KTS 12 while setting a particular address meant for each KTS 12.

As stated above, the digital EX I/F 30*a* connects the KTSs 12 and line unit 16 by performing the interchange of digital signals, synchronization, encoding and decoding, assembly and disassembly of frames, conflict control, address setting, and power feed and thereby effects the time division transmission of voice frames.

Figure 4:
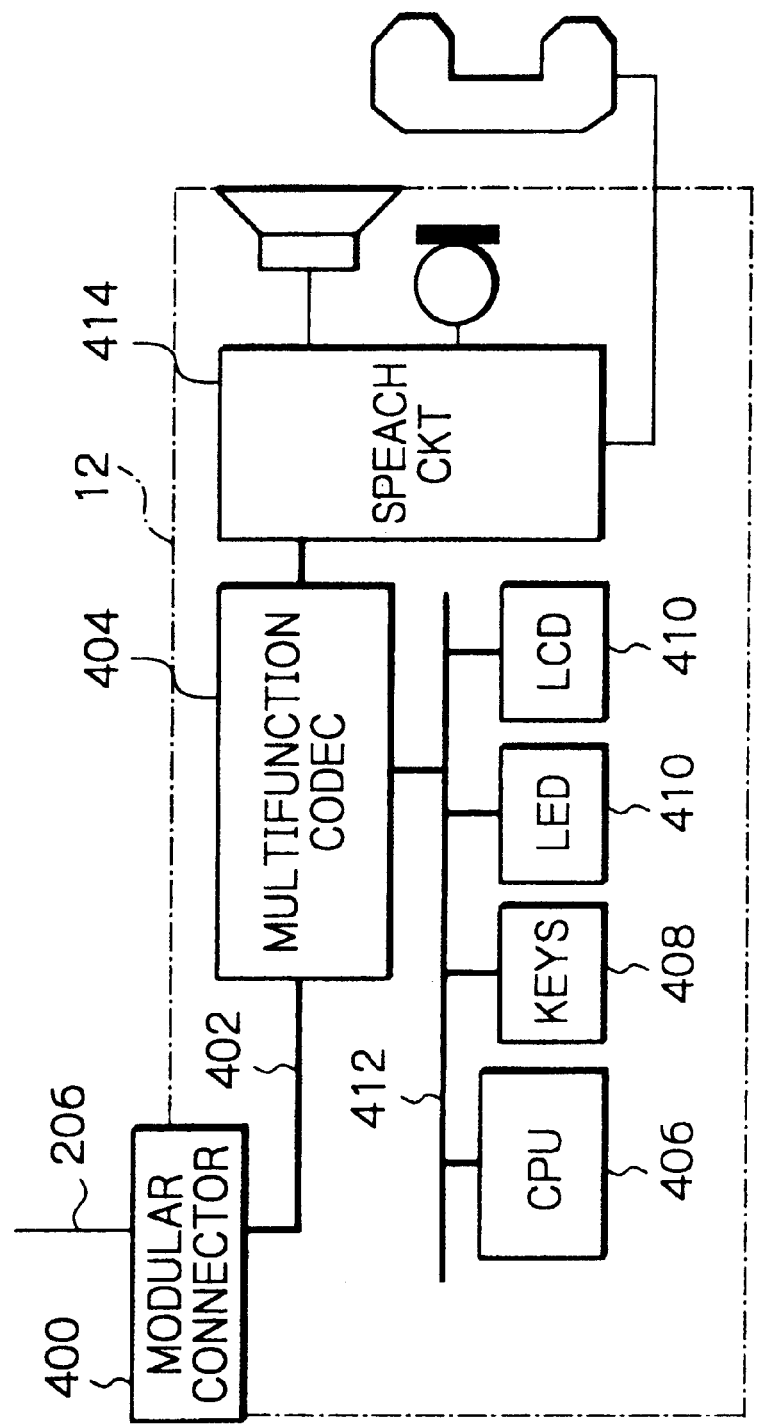
FIG. 4 is a schematic block diagram showing a specific configuration of a digital key telephone.

As shown in FIG. 4, the KTSs 12 connected to the EX I/F 30*a* each include a modular connector 400 to which the two-wire telephone line 206 is connected. The modular connector 400 is connected to a multifunction CODEC 404 by a connection line 206 via an interface circuit not shown. The multifunction CODEC 404 is connected to a bus 412 and a speech circuit 414. Also connected to the bus 412 are a CPU (Central Processing Unit) 406, keys 408 including numeral keys, and a display 410 including LEDs and an LCD. The CODEC 404 decodes encoded data appearing on the connection line 402 and delivers the decoded data to the speech circuit 414. Also, the CODEC 404 encodes voice data output from the speech circuit 414 to PCM codes and sends the PCM codes via the modular connector 400. The CPU 406 controls the various sections of the KTS 12 and distributes a signal to be sent and a received signal to an encoder and a decoder, respectively, constituting the CODEC 404. In addition, the CPU 406 inserts the destination of a call and control information in a frame signal.

On the other hand, a plurality TELs 14 each are connected to a particular analog EX I/F 30*b* by a pair of telephone wires 208. The EX I/F 30*b* includes a plurality of extension interfaces adaptive to standard telephones connected to a public telephone network. The EX I/F 30*b* has various functions including the function of sending a calling signal, the function of feeding currents for conversation, and the function of monitoring DC. Specifically, the EX I/F 30*b* includes a CODEC and a multiplexer/demultiplexer (MUX) although not shown specifically. The CODEC encodes voice signals to output PCM data or decodes PCM data to output voice signals. The multiplexer/demultiplexer multiplexes a plurality of PCM data received from the TELs 14 by TDM and outputs the multiplexed PCM data to the 2MHW 32 or demultiplexes frame signals input via the 2MHW 32 to thereby separate PCM data. The TELs 14 connected to the EX I/F 30*b* each are connectable to a public analog telephone network although not shown specifically.

The EX I/Fs 30*a* and 30*b* each are connected to the corresponding DP RAM 34 by the associated 2MHW 32. A protocol controller 60 controls the frame signal input/output timings of the EX I/Fs 30*a* and 30*b*. The DP RAM 34 is a transmit/receive buffer for temporarily storing 2 Mbps data including voice and control frames and selectively transferring them to the associated EX I/F 30*a* or 30*b* or to the associated packet processing circuit 38.

Each packet processing circuit 38 is connected to the protocol controller 60, LAN I/F circuit 52 and the other packet processing circuits 38 by a control bus 62. The packet processing circuit 38 provides voice packets and a control packet with a LAN format and converts the packets and frame signals on the 2MHW 32 to each other. FIG. 3 shows a specific configuration of the packet processing circuit 38. As shown, the packet processing circuit 38 is a packet assembling/disassembling circuit having a VoIP (Voice over Internet Protocol) function for transmitting and receiving packetized voice signals via an IP network and thereby effecting telephone services. That is, the circuit 38 transforms frame signals at the telephone side and the packets at the switching unit 18 side to each other.

As shown in FIG. 3, the packet processing circuit 38 includes a bus I/F 302 connected to the bus 40 and a bus 300 arranged within the circuit 38. Another bus I/F 304 is connected to the control bus 62 and bus 300. A CPU or controller 306, CPU peripherals 308, a digital signal processor (DSP) 310 and a LAN controller (LANC) 312 are also connected to the bus 300. The packet processing circuit 38 constitutes a computer system in which the CPU 30 executes call processing, voice packet control and UDP/IP (User Datagram Protocol/Internet Protocol) processing based on, e.g., ITU-T recommendation H.323. A particular IP network address and a particular IP host address on a computer network are assigned to each packet processing circuit 38. The IP host address is made up of a destination IP address and a source IP address. In the circuit 38, the IP addresses of the network layer and UDP/IP addresses are added to packet headers. The LANC 312 transforms the packet headers with the above addresses to a LAN format and then outputs them to the connection line 50. The packets 50, i.e., voice and control packets generated by the circuit 38 under the synchronization control of the protocol controller 60 are sent to the integrated voice/data switching unit 18 via the LAN I/F 52, a connector (RJ45), and the connection line 204. Further, the circuit 38 disassembles packets appearing on the connection line 50 into frames. The CPU 306 and DSP 310 provides the frames with a 2MHW format and then outputs them to the 2MHW or output 36.

Specifically, the DSP 310 performs encoding and decoding in accordance with a voice encoding standard G.723.1 or G.729 and additionally performs calculations for, e.g., tone signal generation. The DSP 310 encodes generated signals including a tone signal and sends the resulting signals to the EX I/F 30 via the DP RAM 34. The CPU peripherals 308 include a clock generator, a memory, a memory controller, and an interrupt controller.

The CPU or controller 306 controls voice and control packets, i.e., disassembles packets transferred from the network side via the connection line 50 to thereby produce frames or assembles frame signals input from the associated EX I/F 30 and DP RAM 34 via the 2MHW 36 into packets. The CPU 306 performs the disassembly of packets and the assembly of frames under the control of the protocol controller 60.

The LANC 312, which is an Ethernet 100/10BASE network interface, assembles frames into packets defined on the LAN and delivers them to the connection line 50 or disassembles packets into frames and delivers them to the bus 300. The LANC 312 adds its own hardware or physical address to a packet header or determines whether or not a packet input via the connection line 50 is addressed to the associated unit by referencing a hardware address added to the packet. The LANC 312 accepts only the packets addressed thereto. The blocks 300 through 312 constituting the packet processing circuit 38 may advantageously be mounted on a single semiconductor chip in order to implement a VoIP processor LSI (Large Scale Integrated circuit).

Referring again to FIG. 1, the protocol controller 60 controls synchronization between each packet processing circuit 38 and the EX I/F 30 associated therewith and terminals a protocol. Further, the protocol controller 60 controls synchronization between each 2MHW 32 and the LAN, i.e., controls the transmission/receipt control protocol of each line package 30 connected to the packet processing circuit 38 by the connection line 40, FIG. 3, and the protocol of the network as to timing.

The LAN I/F 52 is connected to the packet processing circuits 38 for controlling both the processing circuits 38 and the connection line 204 of the network as to the transmission and receipt of packets. In the illustrative embodiment, the LAN I/F 52 includes a 100/10BASE LAN interface and switches packets between the individual packet processing circuit 38 and the integrated voice/data switching unit 18 connected thereto by the connection line 204, FIG. 2.

As shown in FIG. 2, in the integrated voice/data switching unit 18 connected to the line unit 16 by the 100BASE network cable 204, the LAN-SW 20 interchanges voice and control packets with desired destinations. The LAN-SW 20 gives priority to voice packets over control packets. The switching unit 18 includes a 10BASE and a 100BASE LAN interface. Terminals including the IP telephone 24 and server 22 and a computer terminal 64 are connected to the 10BASE interface while the line accommodating device 16 is connected to the 100BASE interface.

The switching unit 18 connects and transfers each of voice packets and data packets to a desired destination. In the illustrative embodiment, the switching unit 18 switches voice packets and data packets while giving priority to the former over the latter. The switching unit 18 controls the connection of the packets to a host communication network and, e.g., telephones connected to each network. Further, the switching unit 18 executes the transfer of packets with the server 22 in accordance with, e.g., an H.323 protocol.

Figure 6:
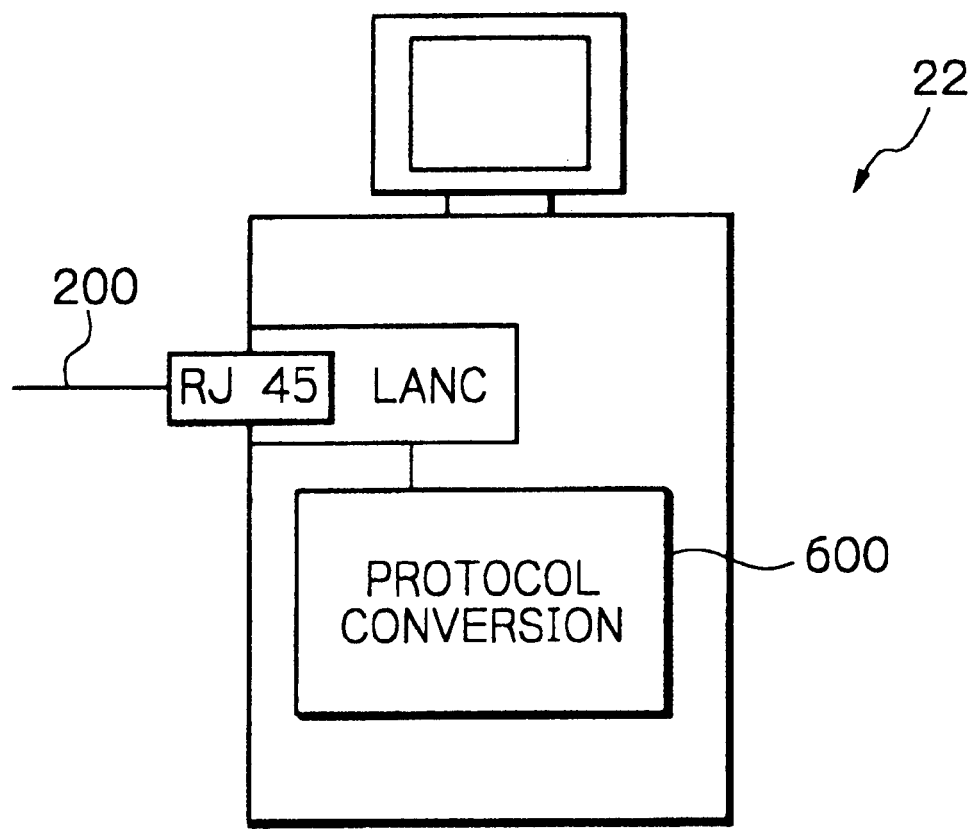
FIG. 6 is a schematic block diagram showing a typical configuration of a server.

FIG. 6 shows a specific configuration of the server 22. As shown, the server 22 includes a connector (RJ45) and a LANC which are connected to the integrated voice/data switching unit 18 by the network cable or connection line 200. The server 22 constitutes a computer system with a gateway function for allowing terminals inside and outside of the LAN to communicate with each other. The server 22 includes a protocol conversion 600 for converting the protocol of the H.323 system and another protocol, so that the server 22 can be connected to, e.g., a host public network. Specifically, the protocol conversion 600 executes protocol conversion on the basis of IP-packetized control data, i.e., a control packet so as to control communication with a host communication network. The server 22 has a band width control function, i.e., executes call control, address resolution and priority control for voice packets 22 with the individual telephone set and individual terminal accommodated in the voice/data switching unit 18. In addition, the server 22 has a function of registering applications including a telephone directory service and a function of controlling a network.

Figure 5:
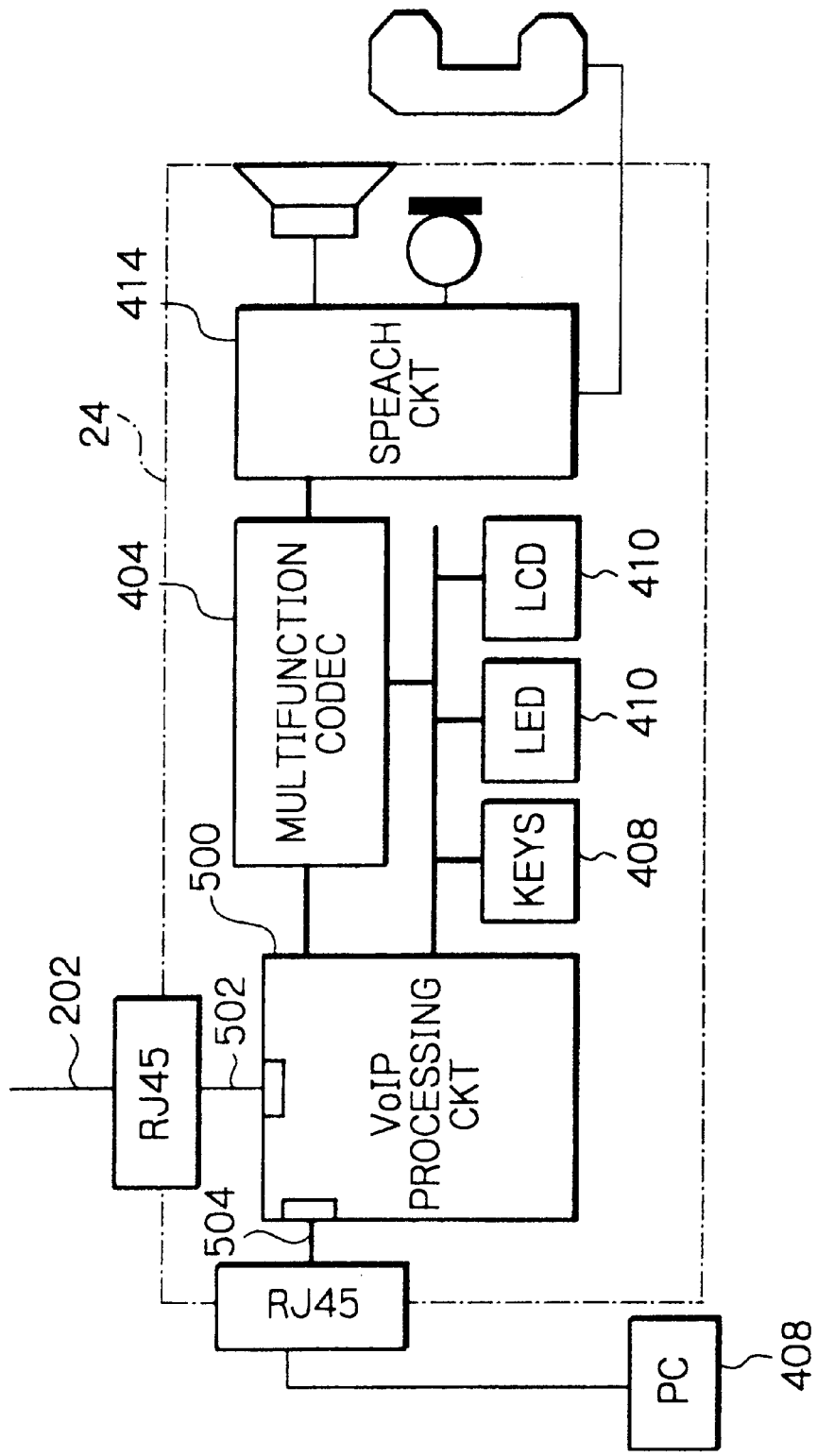
FIG. 5 is a schematic block diagram showing a specific configuration of an IP telephone set.

FIG. 5 shows a specific configuration of the IP telephone 24 connected to the integrated voice/data switching unit 18 by the network cable or connection line 202. As shown, the IP telephone 24 is an Internet protocol telephone including a VoIP processing circuit 500 in place of the CPU 406, FIG. 4, of the KTS 12. The VoIP processing circuit 500 includes a 100/10BASE network interface. The circuit 500 is connected between the network and the multifunction CODEC 404 and serves as a packet assembler/disassembler for converting voice packets and PCM voice signals to each other. The above network interface has an input 502 connected to a connector (RJ45) which is connected to the network cable 202, and another input 504 connected to a personal computer (PC) or similar terminal 26 via a connector (RJ45).

An IP network address and an IP host address defined on the computer network are also assigned to the VoIP processing circuit 500. The circuit 500 packetizes a PCM signal output from the CODEC 404, adds the IP address to the resulting packet, adds an UDP/IP header to the same packet, converts the packet with such headers to a LAN format, and delivers it to the connection line 502. Further, the circuit 500 disassembles a packet to separate a voice PCM signal and feeds the voice PCM signal to the CODEC 404. The CODEC 404 expands the input PCM signal.

Assume that the network computer or similar computer terminal 64 is connected to the integrated voice/data switching unit 18 by the network cable 202. Then, by installing software for implementing an Internet telephone function in the computer terminal 64, it is possible to realize a telephone function for effecting telephone conversation using IP packets. This can be done with a microphone and a speaker connected to the computer terminal 64. Even in such a case, conversation can be held between the computer terminal 64 and a conventional analog telephone. As for communication between personal computers, not only voices but also video signals and numerical data can be packetized and interchanged.

The integrated voice/data switching system 10 having the above construction will be operated as follows. Assume that one EX I/F 30a, for example, included in the line unit 16 detects a call origination signal output from one KTS 12 accommodated therein. Then, the EX I/F 30a packetizes call origination information received from the KTS 12 and outputs the resulting packet to the connection line 50 connected to the corresponding packet processing circuit 38. The call origination information includes the telephone number of the destination. The packet processing circuit 38 obtains an IP address and a port number corresponding to the telephone number with, e.g., a gate keeper and generates a control packet meant for the destination of the IP address. Call origination processing is executed with the control packet.

During the above procedure, the DSP 310 included in the packet processing circuit 30a generates a dial tone and a call tone at the consecutive stages of call control, transforms them to PCM codes, and sends the PCM codes to the EX I/F 30a via the 2MHW 36, DP RAM 34 and 2MHW 32. At the KTS 12, the CODEC 404 decodes the coded tone signals to thereby generate a corresponding audible signal. This allows the operator of the KTS 12 to input the telephone number of the destination and perform other desired operations.

When the control packet generated by the packet processing circuit 38 is input to the LAN-SW 20 of the integrated voice/data switching unit 18 via the network cable 204, the LAN-SW 20 sends a call incoming report to the telephone of the destination. If the telephone of the destination is the IP telephone 24 at which the call can be terminated, the LAN-SW sends a control packet including a ringing signal to the telephone 24. When the IP telephone 24 is off-hooked, a conversation path is set up while, at the same time, an answer packet is returned to the packet processing circuit 38 accommodating the calling KTS 12. When the EX I/F 30a is informed of such a condition, it stops the call tone and allows voice frames to be interchanged.

A PCM voice signal sent from the KTS 12 is converted to a voice frame signal by the EX I/F 30a and then sent to the corresponding packet processing circuit 38 via the 2MHWs 36 and 32 and DP RAM 34. The packet processing circuit 38 generates an IP header on the basis of the input frame, assembles a voice packet in accordance with the voice signal, and sends the voice packet to the switching unit 18 via the connection line 50. On the other hand, when the packet processing circuit 38 detects a voice packet meant for its own IP address via the connection line 50, it disassembles the packet into voice frames and sends the resulting frame signal to the EX I/F 30a via the 2MHWs 36 and 32 and DP RAM 34. The EX I/F 30a sends the frame signal to the KTS 12. The KTS 12 decodes the frame signal and thereby outputs a voice signal. As for a call originated or terminated at any one of the analog TELs 14, the EX I/F 30b accommodating the TEL 14 executes PCM coding and decoding with voice signals.

If the called IP telephone 24 is busy, then the LAN-SW 20 returns a control packet representative of the busy state to the corresponding packet processing circuit 38. The packet processing circuit 38 transfers the control packet to the EX I/F 30a accommodating the calling KTS 12. In response, the EX I/F 30a generates a frame signal representative of the busy state and sends it to the KTS 12.

Assume that a call is originated on the IP telephone 24. Then, when the packet processing circuit 38 accommodating the destination of the call detects a control packet sent from the IP telephone 24, it disassembles the control packet, identifies the destination, and determines whether or not the destination is busy. If the destination is not busy, the packet processing circuit 38 sends a call incoming report to the corresponding EX I/F 30. In response to the report, the EX I/F 30 causes the telephone at the destination to ring. When the telephone at the destination is off-hooked, the EX I/F 30 sets up a conversation path. This is also followed by the previously stated processing for voice packet interchange.

As stated above, the line unit 16 connected to the integrated voice/data switching system 10 can be implemented by existing extension/outside interface circuits or similar line packages. The line unit 16 is connected to the packet processing circuits 38 by time division communication path (2MHW) interfaces and DP RAMs customary with a PBX. For example, an interface circuit included in an existing PBX accommodates a plurality of telephones or similar terminals while a plurality of units each having a packet processing circuit, a DP RAM and an interface circuit are connected by a LAN. The line unit 16 is connected to the switching unit 18 by the connection line 50 and LAN I/F 52. It is therefore possible to easily extend the configuration of the line unit 16 in order to increase or decrease the number of lines to accommodate, as desired.

The line unit 16 allows, e.g., the existing analog TELs 14 to communicate with the IP telephone set 24. Further, the line unit 16 allows the telephones and personal computer or similar computer 64, FIG. 2, to communicate with each other if a conversation program is installed in the computer 64. Such conversation between different kinds of terminals is applicable even to destination terminals not directly connected the switching unit 18. For example, there can be effected conversation and data interchange with terminals connected by an IP network and even connection, if the device includes a trunk connected to a public network, to destination telephones via an existing switching network.

When a conventional PBX system exists, it can be readily reconstructed into a shared conversation/data switching system without newly installing telephones, line packages or telephone wirings. That is, the switching system 10 allows such existing devices to be accommodated in the line unit 16 and connected to the voice/data switching unit 18. This is successful to use existing devices and therefore to smoothly reconstruct a conventional telephone system using only voice signals into a shared voice/data communication system. The device 16 may be built in the switching unit 18 and does not have to be newly designed when use is made of existing line packages. It follows that a switching system capable of providing various kinds of services can be developed with a minimum number of steps.

In summary, it will be seen that in accordance with the present invention, there can be constructed a system capable of accommodating conventional telephones and telephone wirings and even extension circuits and trunk circuits associated with office lines, implementing voice communication using a data communication network. This can be done without rearranging the extension circuits, trunks or the like exclusively for the above system and therefore with a minimum of designing and developing steps. Further, the system allows, e.g., an analog telephone to communicate even with a computer connected to a computer network or an IP telephone. Particularly, a conventional voice communication switching system can be readily reconstructed into a system capable of integrating voice communication and data communication.

The entire disclosure of Japanese patent application No. 170401/1999 filed Jun. 17, 1999 including the specification, claims, accompanying drawings and abstract of the disclosure is incorporated herein by reference in its entirely.

While the present invention has been described with reference to the illustrative embodiment, it is not to be restricted by the embodiment. It is to be appreciated that those skilled in the art can change or modify the embodiment without departing from the scope and spirit of the present invention.

What is claimed is:

1. A device for accommodating a plurality of voice terminals for voice communication and connecting said voice terminals to a switching unit, said device comprising:

a plurality of digital extension interface circuits each accommodating a plurality of digital voice terminals of said plurality of voice terminals and controlling calls originating from and calls incoming to said plurality of digital voice terminals, said plurality of digital extension interface circuits connecting said plurality of digital voice terminals to first time division multiplexing communication highway paths;

a plurality of analog extension interface circuits each accommodating a plurality of analog voice terminals of said plurality of voice terminals and controlling calls originating from and calls incoming to said plurality of analog voice terminals, said plurality of analog extension interface circuits connecting said plurality of analog voice terminals to second time division multiplexing communication highway paths;

a plurality of storages connected to said plurality of digital extension interface circuits and said plurality of analog extension interface circuits for storing frame signals transferred via an associated one of said first or second time division multiplexing communication highway paths;

a plurality of packet processing circuits, each connected to an associated one of said plurality of storages via a respective third time division multiplexing communication highway path, for converting the frame signal to packets and for converting packets to frame signals;

a transferring circuit interfacing with said plurality of packet processing circuits and with a local area network via said switching unit for switching and transferring the packets; and a synchronization controller for controlling synchronization between said plurality of digital and analog interface circuits and said plurality of packet processing circuits.

2. A device in accordance with claim 1, wherein said switching unit is a packet switching unit that is connected to said transferring circuit, said device being capable of communicating with other voice terminals accommodated by said packet switching unit.

3. A device in accordance with claim 1, wherein each of said plurality of digital voice terminals accommodates a digital key telephone.

4. A device in accordance with claim 1, wherein each of said plurality of analog voice terminals accommodates an analog telephone.

5. A device in accordance with claim 1, further comprising a trunk circuit connected to an office line.

* * * * *